United States Patent [19]

Yamamoto et al.

[11] Patent Number: 5,462,122

[45] Date of Patent: Oct. 31, 1995

[54] AUTOMATIC DRIVE CONTROL SYSTEM FOR A BULLDOZER

[75] Inventors: Shigeru Yamamoto; Shigenori Matsushita; Shu H. Zhang; Satoru Nishita; Kazushi Nakata, all of Hirakata, Japan

[73] Assignee: Kabushiki Kaisha Komatsu Seisakusho, Tokyo, Japan

[21] Appl. No.: 265,720

[22] Filed: Jun. 24, 1994

[30] Foreign Application Priority Data

Jul. 8, 1993 [JP] Japan ................... 5-169023

[51] Int. Cl.⁶ .................. E02F 3/76; E02F 3/00
[52] U.S. Cl. ................. 172/2; 172/4.5; 364/424.07
[58] Field of Search ............... 37/301, 236, 403; 172/1, 2, 3, 4, 4.5, 7, 40, 777, 812, 815, 821, 826, 831; 180/6.48, 24.12, 308, 333; 364/424.07, 424.1, 138, 468

[56] References Cited

U.S. PATENT DOCUMENTS

| | | | |
|---|---|---|---|
| 3,556,225 | 1/1971 | Matsuzaki | 172/4.5 |
| 3,751,903 | 8/1973 | Bauchet et al. | 172/7 X |
| 4,630,685 | 12/1986 | Huck, Jr. et al. | |
| 4,805,086 | 2/1989 | Nielsen et al. | 364/167.01 |
| 4,934,463 | 6/1990 | Ishida et al. | 172/4.5 |
| 5,297,649 | 3/1994 | Yamamoto et al. | 172/3 X |

FOREIGN PATENT DOCUMENTS

| | | |
|---|---|---|
| 53-5441 | 2/1978 | Japan . |
| 53-6967 | 2/1978 | Japan . |
| 55-36776 | 9/1980 | Japan . |
| 63-31618 | 6/1988 | Japan . |
| 1-62525 | 3/1989 | Japan . |
| 3-43523 | 2/1991 | Japan . |
| 6-3886 | 2/1994 | Japan . |

Primary Examiner—Randolph A. Reese
Assistant Examiner—Robert Pezzuto
Attorney, Agent, or Firm—Armstrong, Westerman, Hattori, McLeland and Naughton

[57] ABSTRACT

An automatic drive control system for a bulldozer comprising a digging start detector for detecting that the bulldozer is in a digging start position, a digging end detector for detecting that the bulldozer is in a digging end position, a driving direction detector for detecting the momentarily varying driving direction of the bulldozer, and a drive controller for shifting a transmission into a forward gear when the digging start detector detects that the bulldozer is presently in the digging start position; shifting the transmission into a reverse gear when the digging end detector detects that the bulldozer is presently in the digging end position; and controlling the bulldozer such that the driving direction detected by the driving direction detector is made coincident with a target driving direction when the bulldozer is moving from the digging start position towards the digging end position.

21 Claims, 12 Drawing Sheets

AUTOMATIC DRIVE CONTROL SYSTEM FOR A BULLDOZER

BACKGROUND OF THE INVENTION

1. Field of the Invention

The present invention relates to an automatic drive control system for automatically driving a bulldozer such that the bulldozer moves back and forth predetermined times between a digging start position and a digging end position.

2. Description of the Prior Art

In most prior art bulldozers, dozing operation is manually performed by the operator throughout. Specifically, during dozing operation, the operator lifts and lowers the blade such that the load imposed on the blade during digging and carrying is maintained constant, while avoiding the occurrence of the running slip (shoe slip) of the vehicle body. The operator also operates a steering lever and blade control lever (tilt lever) in order to adjust the driving direction of the bulldozer. When such dozing operation is carried out on the edge of a cliff, the operator judges where he should drop removed soil by his own eyes or from a sign received from an assistant workman.

SUMMARY OF THE INVENTION

To manually perform dozing operation as described above presents the disadvantage that it involves a number of lifting and lowering operations so that the operator gets exhausted tremendously even if he is very skillful. Another disadvantage is that when the manual dozing operation is carried out on the edge of a cliff, there is danger that the bulldozer falls off the cliff in the event of operational errors and therefore the operator has to particularly concentrate his attention on the work.

The present invention has been made in order to overcome such disadvantages and therefore one of the objects of the invention is to provide an automatic drive control system for a bulldozer that is capable of automatically determining a digging starting position, a digging end position and a direction in which the bulldozer should be driven, so that limitative unmanned drive becomes possible.

In accomplishing this and other objects, there has been provided, in accordance with the present invention, an automatic drive control system for a bulldozer which is capable of automatically driving a bulldozer such that the bulldozer moves back and forth predetermined times between a digging start position and a digging end position, the automatic drive control system comprising:

(a) digging start detecting means for detecting that the bulldozer is in the digging start position;

(b) digging end detecting means for detecting that the bulldozer is in the digging end position;

(c) driving direction detecting means for detecting the momentarily varying driving direction of the bulldozer; and (d) drive controlling means for shifting a transmission into a forward gear when the digging start detecting means detects that the bulldozer is presently in the digging start position; shifting the transmission into a reverse gear when the digging end detecting means detects that the bulldozer is presently in the digging end position; and controlling the bulldozer such that the driving direction detected by the driving direction detecting means is made coincident with a target driving direction when the bulldozer is moving from the digging start position towards the digging end position.

According to the above-described automatic drive control system, after the bulldozer has been guided to the digging start position and an instruction has been released to start digging, the transmission is shifted into a forward gear and the bulldozer is forwardly driven towards the digging end position, whereby the desired dozing operation is automatically carried out. During the forward driving which involves dozing, the momentarily varying driving direction of the bulldozer is detected by the driving direction detecting means, and control is performed such that the detected driving direction is made coincident with a target driving direction. When the bulldozer has reached the digging end position, for example, on the edge of a cliff, the transmission is shifted into a reverse gear so that the bulldozer is driven back towards the digging start position. In such a way, the bulldozer moves back and forth predetermined times between the digging start position and the digging end position, while its driving direction is being corrected, and thus unmanned dozing operation is carried out in a specified lane. With such a control, fatigue of the operator can be reduced and safety can be ensured even if the dozing operation is carried out on a cliff.

Preferably, the automatic drive control system further comprises driving direction changing means for changing the driving direction of the bulldozer.

Preferably, the automatic drive control system further comprises blade controlling means for controlling lifting and lowering of the blade such that an actual tractive force exerted on the vehicle body is made coincident with a set target tractive force while the bulldozer is moving from the digging start position towards the digging end position.

The digging start detecting means preferably comprises (i) at least one laser projector installed on the ground and (ii) a laser beam sensor incorporated in the bulldozer for receiving a laser beam directed from the laser projector. Alternatively, the digging start detecting means may comprise (i) at least one laser beam projecting/receiving device installed on the ground and (ii) a reflector incorporated in the bulldozer for reflecting a laser beam directed from the laser beam projecting/receiving device in the same direction. Further, the digging start detecting means may be a detector which detects that the bulldozer has returned to the digging start position, by counting the number of revolutions of sprockets for actuating crawler belts, the count being started immediately after the bulldozer has left the digging end position when the bulldozer moves backwards.

The digging end position may be an edge of a cliff from which removed soil is to be dropped and the digging end detecting means may be designed to detect that the forward end of the bulldozer is on the edge of a cliff. Concretely, the digging end detecting means may comprise (i) at least one laser projector installed on the ground and (ii) a laser beam sensor incorporated in the bulldozer for receiving a laser beam directed from the laser projector. Alternatively, the digging end detecting means may comprise (i) at least one laser beam projecting/receiving device installed on the ground and (ii) a reflector incorporated in the bulldozer for reflecting a laser beam directed from the laser beam projecting/receiving device in the same direction. Further, the digging end detecting means may comprise an ultrasonic sonar incorporated in the bulldozer for projecting ultrasonic waves ahead of the vehicle body to detect the presence or absence of the ground. In this case, the projecting angle of the ultrasonic sonar is preferably adjustable. Further, the digging end detecting means may comprise a load detector for detecting a change in the load imposed on the blade to estimate the amount of soil present in front of the blade.

In the digging start detecting means and the digging end detecting means, the laser projector may be rotatable within a vertical plane and the laser beam sensor may be arranged such that its longitudinal axis is horizontally oriented. In these means, the laser beam projecting/receiving device may be rotatable within a horizontal plane and the reflector may be disposed such that its longitudinal axis is vertically oriented.

The driving direction detecting means may comprise an azimuth sensor for detecting a direction utilizing earth magnetism. Alternatively, the driving direction detecting means may comprise (i) at least two laser beam projecting/receiving devices installed on the ground which are rotatable within a horizontal plane to project laser beams synchronously, and (ii) a reflector which reflects laser beams directed from the laser beam projecting/receiving devices in the same direction and which is provided in the bulldozer such that its longitudinal axis is vertically oriented. Further, the driving direction detecting means may comprise (i) at least one laser projector installed on the ground and rotatable within a vertical plane, and (ii) at least two laser beam sensors which are provided in the bulldozer such that their longitudinal axes are horizontally oriented and which receive a laser beam directed from the laser projector. These laser beam sensors detect the relative angle between the plane of a laser beam directed from the laser projector and the vehicle body, thereby detecting the driving direction of the bulldozer. Further, the driving direction detecting means may detect the driving direction of the bulldozer by integrating data from a yaw rate gyro.

The driving direction changing means may be a steering system which transmits the power of an engine to the right and left sprockets for actuating the crawler belts with the help of clutches and brakes. These clutches and brakes may be independently engaged or disengaged prior to a start of dozing operation to change the driving direction of the bulldozer. Further, the driving direction changing means may tilt the blade laterally during dozing operation to change the driving direction of the bulldozer.

The automatic drive control system of the invention may include remote control means for guiding the bulldozer to the desired digging lane. The provision of the remote control means allows the operator to guide the bulldozer from a position remote from the bulldozer so that one operator can supervise a plurality of bulldozers.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIG. 1 is a view of the external appearance of the bulldozer;

FIG. 2 is a skeleton diagram of a power transmission system of the bulldozer;

FIG. 3 is a schematic block diagram of the overall construction of the automatic drive control system;

FIG. 4 is a detailed view of a blade lift cylinder stroke sensor;

FIG. 5 is a perspective view of the bulldozer as it is in dozing operation according to a first embodiment;

FIG. 6 is a perspective view of a laser beam sensor;

FIG. 7 is a flow chart of a basic program for the automatic drive control system;

FIG. 8 is a flow chart of a driving direction correction routine;

FIG. 9 is a graph showing a characteristic map of steering instructions;

FIG. 10 is graphs showing patterns of load applied to a blade;

FIG. 11 is a perspective view of a bulldozer as it is in dozing operation according to a second embodiment; and FIG. 12 is a perspective view of a reflector according to the second embodiment.

PREFERRED EMBODIMENTS OF THE INVENTION

With reference to the drawings, preferred embodiments of an automatic drive control system for a bulldozer according the invention will be hereinafter described.

Figure 1:
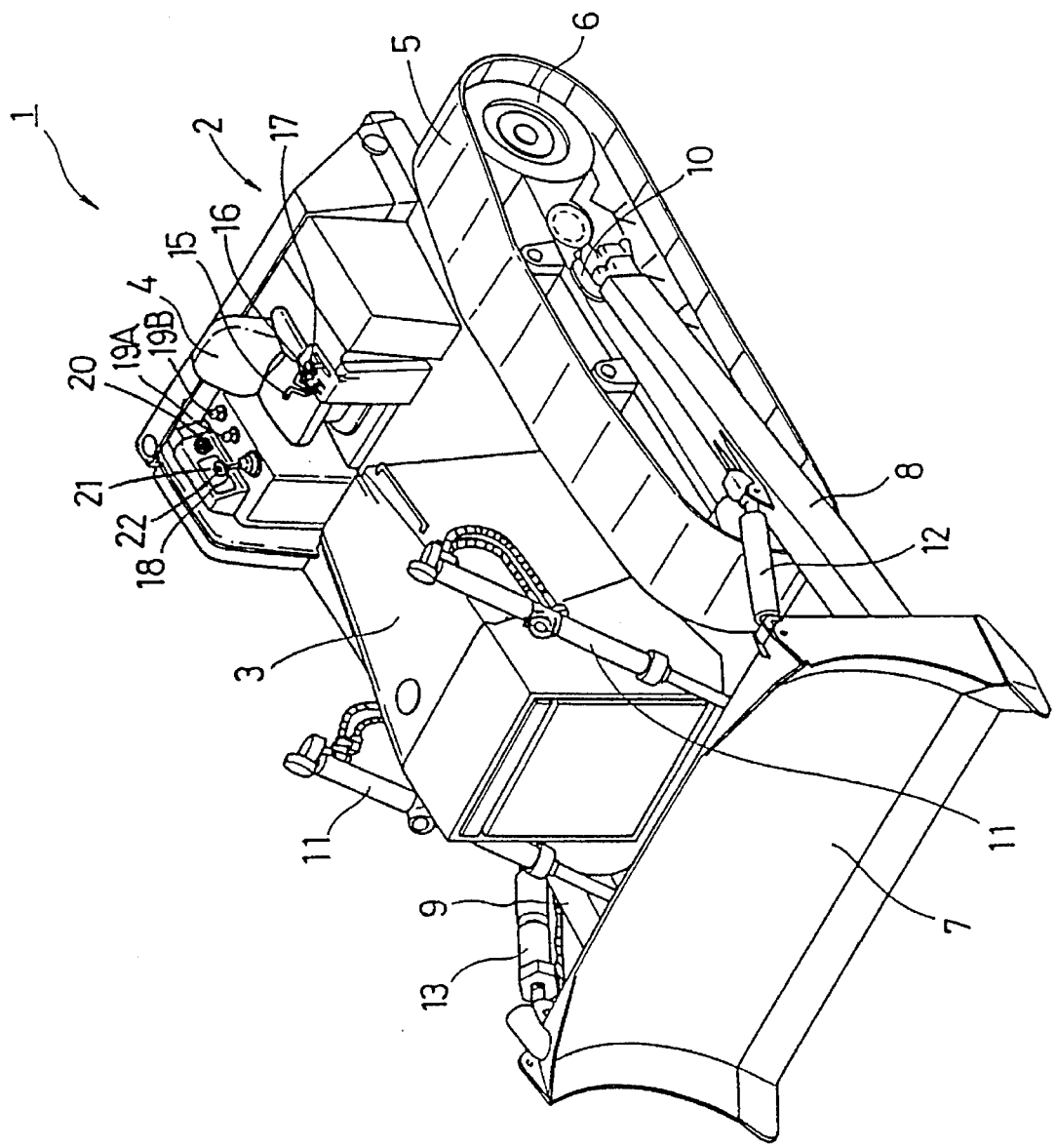
FIGS. 1 to 12 provide illustrations of preferred embodiments of an automatic drive control system for a bulldozer according to the invention.

Referring initially to FIG. 1, there is shown the external appearance of a bulldozer 1. The bulldozer 1 is provided with, on a vehicle body 2 thereof, a bonnet 3 for housing an engine (not shown) and an operator seat 4 for the operator who drives the bulldozer 1. Both sides (i.e., the right and left sides of the vehicle body 2 when viewing in its moving direction) of the vehicle body 2 are provided with crawler belts 5 for turning the vehicle body 2 or driving it back and forth. Note that the crawler belt 5 on the right side is now shown in the drawing. These crawler belts 5 are independently driven by their respective sprockets 6 actuated by driving force transmitted from the engine.

On the right and left sides of the vehicle body 2, there are provided straight frames 8, 9 for supporting a blade 7 at the forward ends thereof. The base ends of these right and left straight frames 8, 9 are pivotally supported on the vehicle body 2 by means of trunnions 10 in such a manner that the blade 7 can be lifted or lowered. Note that the trunnion 10 on the right side is not shown.

Disposed between the blade 7 and the vehicle body 2 are right and left blade lift cylinders 11 arranged in a pair for lifting or lowering the blade 7. For tilting the blade 7 to the right and left, there are provided a brace 12 between the blade 7 and the left straight frame 8 and a blade tilt cylinder 13 between the blade 7 and the right straight frame 9.

There are provided a steering lever 15, a gear shift lever 16 and a fuel control lever 17 on the left of the operator seat 4 when viewing in the moving direction. On the right of the operator seat 4, there are provided a blade control lever 18 for lifting and lowering the blade 7 and tilting it to the right and left; a first dial switch 19A for setting an amount of load to be imposed on the blade 7; a second dial switch 19B for correcting the set amount of load; a lock-up selector switch 20 for switching the lock-up mechanism of a torque convertor ON or OFF; and a display unit 21. Disposed on the top of the blade control lever 18 is an operation mode selector button 22 for switching dozing operation among a manual operation mode, an automatic digging mode and an automatic carrying mode, according to how many times the button 22 has been depressed. Although they are not shown in the drawing, a brake pedal and a decelerator pedal are disposed in front of the operator seat 4.

Figure 2:
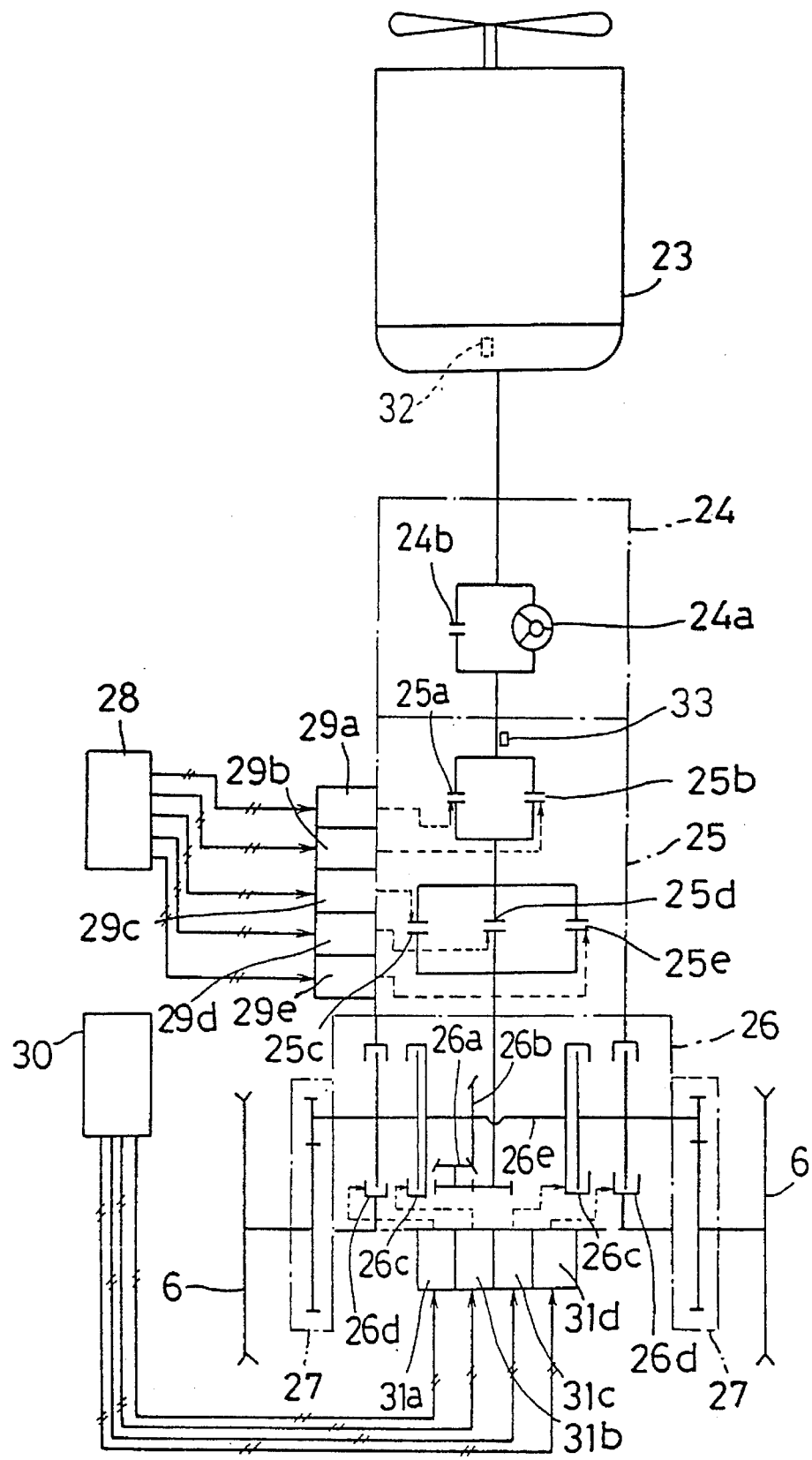

Referring to FIG. 2 which shows a power transmission system, rotary driving force from an engine 23 is transmitted to a torque convertor unit 24 which includes a torque convertor 24a and a lock-up clutch 24b. Then, the rotary driving force is transmitted from the output shaft of the torque convertor unit 24 to a transmission 25 whose input shaft is coupled to the output shaft of the torque convertor unit 24. The transmission 25 is, for example, a planetary gear lubricated multiple-disc clutch transmission and includes forward and reverse clutches 25a, 25b and first to third clutches 25c to 25e so that the revolution speed of the output shaft of the transmission 25 can be shifted in three ranges in both forward and backward directions. The rotary driving force from the output shaft of the transmission 25 is transmitted to a steering unit 26 which includes a pinion 26a and a transverse shaft 26e on which there are disposed a bevel gear 26b, right and left steering clutches 26c arranged in a pair, and fight and left steering brakes 26d arranged in a pair. Thereafter, the rotary driving force is transmitted to right and left final reduction mechanisms 27 arranged in a pair so that each of the sprockets 6 for running the crawler belts 5 (not shown in FIG. 3) is driven.

The clutches 25a to 25e provided in the transmission 25 are independently controlled by their corresponding electronic modulation valves 29a to 29e respectively, in response to control signals from a transmission controller 28. Similarly, the right and left steering clutches 26c and the right and left steering brakes 26d of the steering unit 26 are independently controlled by their corresponding electronic modulation valves 31a to 31d respectively, in response to control signals from a steering controller 30. Reference numeral 32 denotes an engine revolution sensor for detecting the revolution speed of the engine 23 and reference numeral 33 denotes a torque convertor output shaft revolution sensor for detecting the revolution speed of the output shaft of the torque convertor unit 24.

Figure 3:
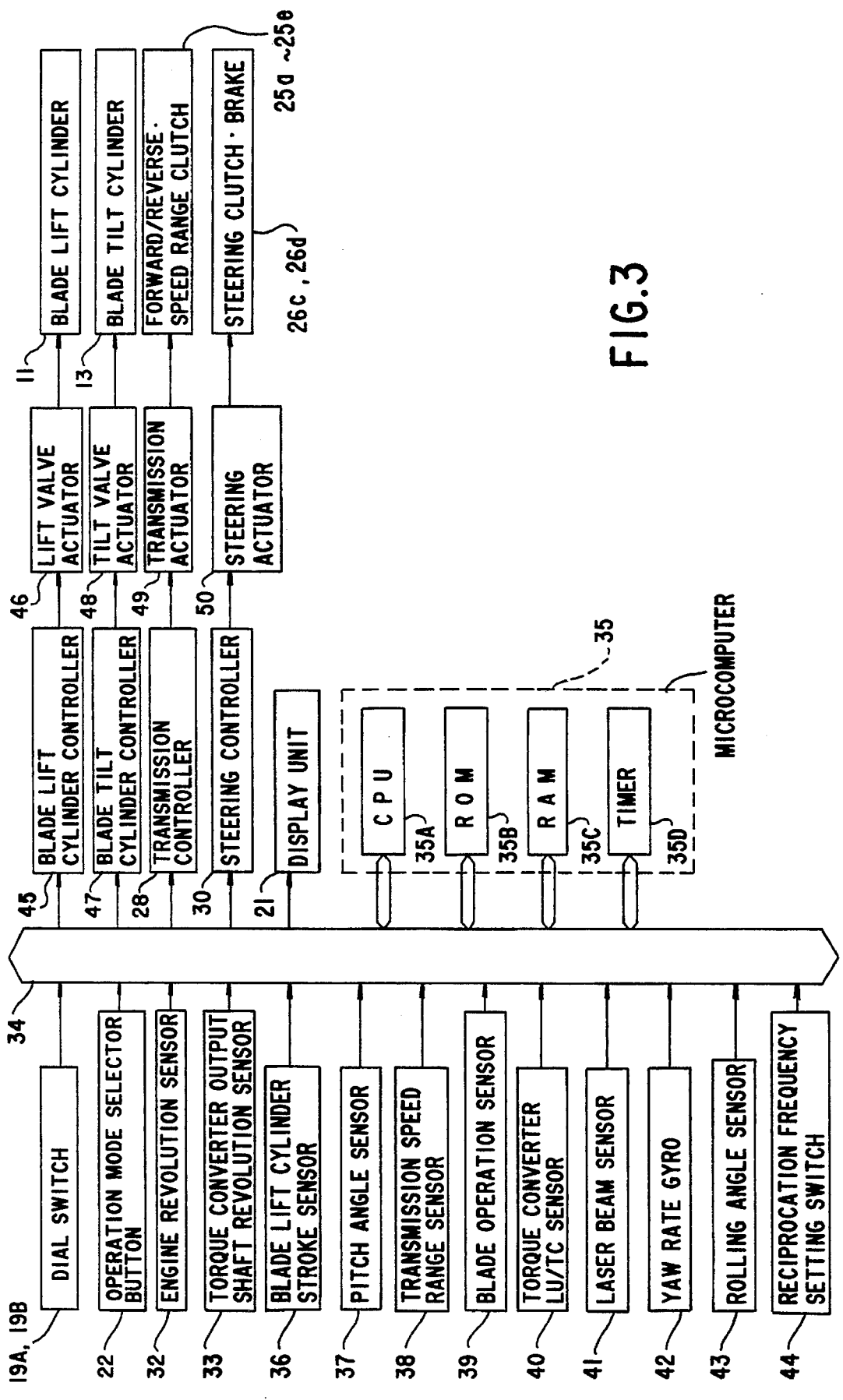

Referring to FIG. 3 which schematically shows the overall construction of the automatic drive control system for a bulldozer according to one embodiment of the invention, the following data items are provided over a bus 34 to a microcomputer 35: (i) dial value data from the first dial switch 19A, regarding a set amount of load to be imposed on the blade 7; (ii) dial value data from the second dial switch 19B, regarding a correction value for the set amount of load; (iii) button pressing state data from the operation mode selector button 22, regarding which of the modes (manual operation mode, automatic digging mode, automatic carrying mode for dozing operation) has been selected; (iv) revolution speed data from the engine revolution sensor 32, regarding the revolution speed of the engine 23; and (v) revolution speed data from the torque convertor output shaft revolution sensor 33, regarding the revolution speed of the output shaft of the torque convertor unit 24.

The following data items are also provided over the bus 34 to the microcomputer 35: (i) stroke positional data from fight and left blade lift cylinder stroke sensors 36 which detect the amount of strokes of the pair of right and left blade lift cylinders 11 for lifting or lowering the blade 7; (ii) pitch angle data from a pitch angle sensor 37 for detecting the momentarily varying pitch angle of the vehicle body 2; (iii) speed range state data from a transmission speed range sensor 38 for detecting which of the speed ranges has been selected in the transmission 25 by operating the gear shift lever 16; (iv) manual operation state data from a blade operation sensor 39 which detects whether the blade 7 is being manually operated by the blade control lever 18; (v) LU/TC state data from a torque convertor LU/TC sensor 40 which detects the state (locked-up (LU) or torque converting (TC)) of the torque convertor, the state being changed by operating the lock-up selector switch 20; (vi) bulldozer positional data from laser beam sensors 41 ($41_S$, $41_E$), regarding the present position of the bulldozer 1, the laser beam sensors 41 receiving laser beams from laser projectors $57_S$, $57_E$ (to be described later) installed on the ground; (vii) yaw angle data from a yaw rate gyro 42 of the optical fiber type, which measures the yaw angle (yaw angular rate) of the vehicle body 2 relative to a target driving direction; (viii) rolling angle data from a rolling angle sensor 43 which detects the momentarily varying rolling angle of the vehicle body 2; and (ix) dial value data from a reciprocation frequency setting switch 44 which sets the number of reciprocating movements to be carried out by the bulldozer 1 in a specified lane, when the bulldozer 1 is in automatic operation.

The microcomputer 35 is composed of a central processing unit (CPU) 35A for executing a specified program; a read only memory (ROM) 35B for storing this program and various maps; a random access memory (RAM) 35C serving as a working memory necessary for executing the program and as registers for various data; and a timer 35D for measuring elapsed time for an event in the program. The program is executed in accordance with (i) the dial value data, regarding a set amount of load to be imposed on the blade 7; (ii) the dial value data, regarding a correction value for the set amount of load; (iii) the button pressing state data from the operation mode selector button 22; (iv) the revolution speed data of the engine 23; (v) the revolution speed data of the output shaft of the torque convertor unit 24; (vi) the stroke positional data of the right and left blade lift cylinders 11; (vii) the pitch angle data of the vehicle body 2; (viii) the speed range state data of the transmission 25; (ix) the manual operation state data of the blade 7; (x) the LU/TC state data of the torque convertor; (xi) the bulldozer positional data of the bulldozer 1; (xii) the yaw angle data of the vehicle body 2 relative to a target driving direction; (xiii) the rolling angle data of the vehicle body 2; and (xiv) the dial value data regarding the number of reciprocating movements to be carried out by the bulldozer 1 when the bulldozer 1 is in automatic operation. As a result, data on a lift operation amount for lifting or lowering the blade 7 is supplied to the blade lift cylinder controller 45, which controls a lift valve actuator 46 to actuate the pair of right and left blade lift cylinders 11 based on the lift operation amount. Also, data on a tilt operation amount for tilting the blade 7 laterally is supplied to a blade tilt cylinder controller 47, which controls a tilt valve actuator 48 to actuate the blade tilt cylinder 13, based on the tilt operation amount. Further, a switch-over signal for shifting speed ranges and driving directions (forward and reverse) is sent to the transmission controller 28, which controls a transmission actuator 49 to actuate the forward clutch 25a, the reverse clutch 25b, and the first to third clutches 25c, 25d, 25e. A signal for operating the steering unit 26 is also supplied to the steering controller 30, which controls a steering actuator 50 to actuate the steering clutches 26c and the steering brakes 26d. The display unit 21 displays information such as whether the bulldozer 1 is presently in the manual operation mode, the automatic digging mode or the automatic carrying mode for dozing operation.

Figure 4:
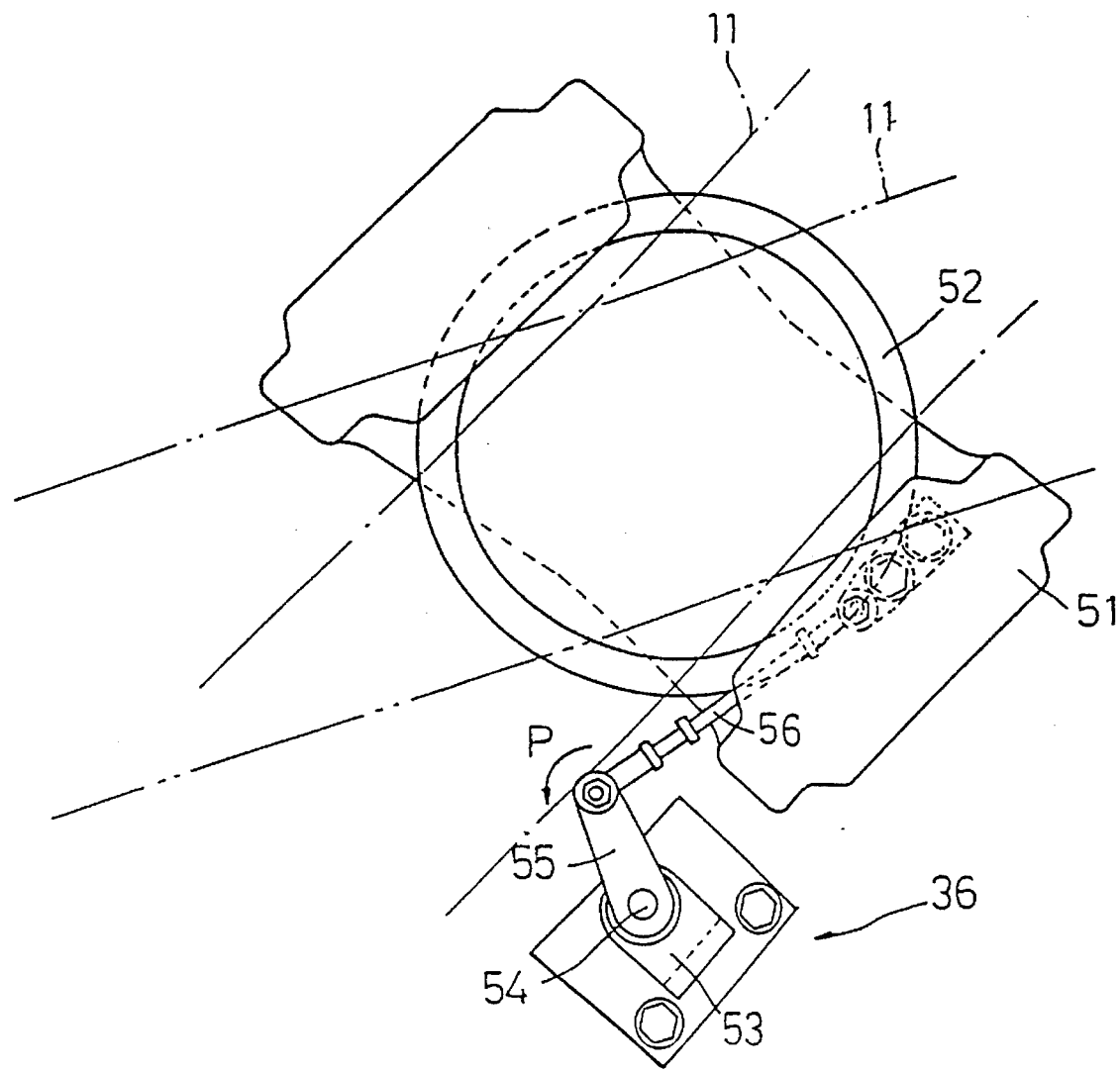

The blade lift cylinder stroke sensors 36 detect, as shown in FIG. 4, the strokes of the blade lift cylinders 11, by measuring the amount of the inclination of each of the blade lift cylinders 11. Note that FIG. 4 shows, in an enlarged form, the left side of the bulldozer 1 and the following description is based on either of the side. The blade lift cylinder 11 is supported by a disk-shaped cylinder supporting member 52 which is so supported as to be freely rotatable in a vertical plane relative to a mounting bracket 51. The bracket 51 is fixedly attached to the vehicle body 2 of the bulldozer 1. Disposed adjacent to the cylinder supporting member 52 on the vehicle body 2 is a potentiometer 53 which constitutes a part of the blade lift cylinder stroke sensor 36. An arm 55 is attached to a pivoting shaft 54 of the potentiometer 53 and the forward end of the arm 55 is coupled to the rotating portion of the cylinder supporting member 52 by means of a rod 56. When the blade lift cylinder 11 is operated to rotate from the position indicated by a chain line to the position indicated by a two-dot chain line (see FIG. 4), the arm 55 is pushed by the rod 56 so that the arm 55 pivots in the direction of arrow P. This pivoting angle is detected by the potentiometer 53. Since each of the fight and left blade lift cylinders 11 has its own blade lift cylinder stroke sensor 36, the difference between the pivoting angles of the blade lift cylinders 11 can be obtained by arithmetic operation. With this difference, the tilting amount of the blade 7 which is tilted by the operation of the blade tilt cylinder 13 can be detected as well.

Figure 5:
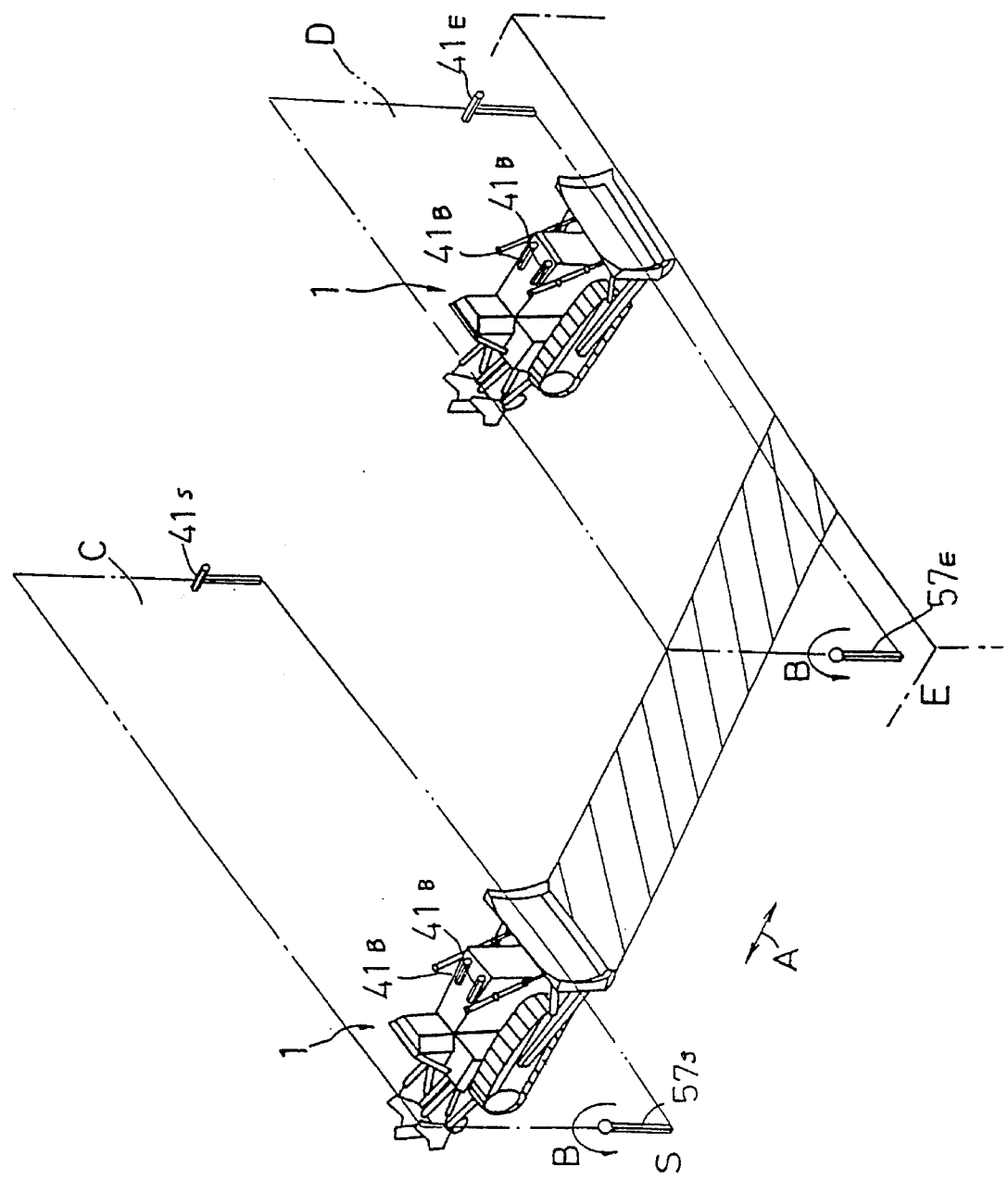
Figure 6:
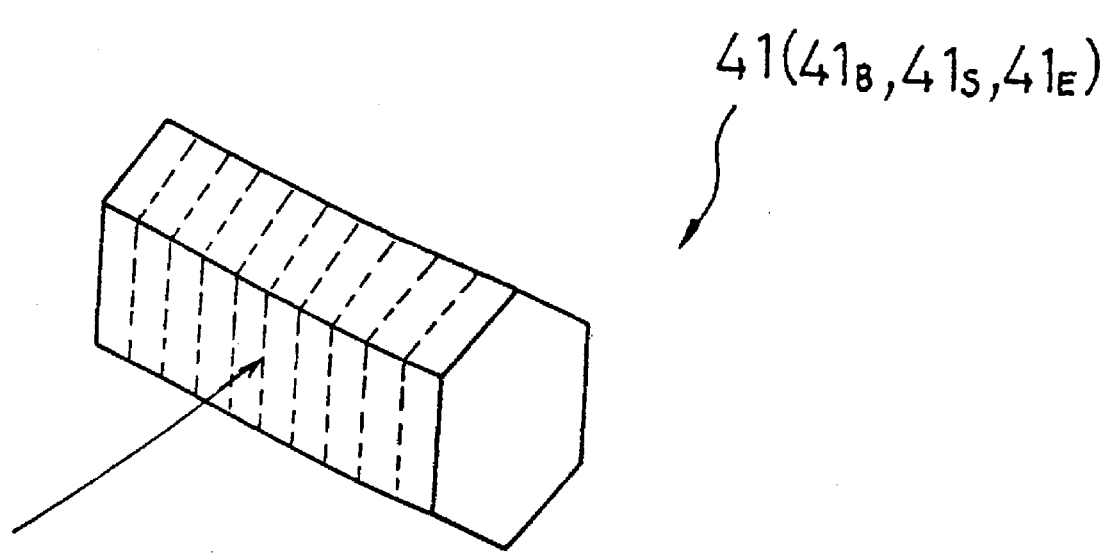

As shown in FIG. 5, the laser projectors $57_S$, $57_E$ are installed on the ground in a job site where dozing operation is carried out by the bulldozer 1 of this embodiment. The laser projector $57_S$ is installed at a digging start position S, while the laser projector $57_E$ at a digging end position E (on the edge of a cliff). The respective laser projecting parts of the projectors $57_S$, $57_E$ can be rotated around an horizontal axis (which is parallel with the driving direction (direction A in FIG. 5) of the bulldozer 1) in the direction of arrow B, so that two vertical planes C, D are formed in the working area of the bulldozer 1 by laser beams projected from the laser projectors $57_S$, $57_E$. On the bonnet 3 of the bulldozer 1, there are provided laser beam sensors $41_B$ which are aligned laterally to receive laser beams from the laser projectors $57_S$, $57_E$ (these sensors are not shown in FIG. 1). Each laser beam sensor $41_B$ is hexagonal prismatic and formed by layered light receiving parts. These laser beam sensors $41_B$ are disposed with their longitudinal axes being parallel with the driving direction of the bulldozer 1, so that the sensors $41_B$ intersect the vertical planes C, D formed by the laser beams when the bulldozer 1 is in predetermined positions. The arrow in FIG. 6 represents an incident laser beam. Disposed on the ground opposite to the laser projectors $57_S$, $57_E$ are laser beam sensors $41_S$, $41_E$. These sensors $41_S$, $41_E$ are placed at the substantially same level as the laser beam sensors $41_B$ provided in the bulldozer 1 and have the same structure as those of the laser beam sensors $41_B$. The laser beam sensors $41_S$, $41_E$ on the ground are also disposed with their longitudinal axes parallel with the driving direction of the bulldozer 1 in order to confirm that laser beams are projected from the laser projectors $57_S$, $57_E$.

With the above-described arrangement, when a laser beam projected from the laser projector $57_S$ placed in the digging start position S is received by the laser beam sensors $41_B$ provided on the bulldozer 1, it is judged that the bulldozer 1 is in the digging start position S. On the other hand, when a laser beam projected from the laser projector $57_E$ placed in the digging end position E is received by the laser beam sensors $41_B$ provided on the bulldozer 1, it is judged that the bulldozer 1 is in the digging end position (on the edge of a cliff) E.

The reason for providing the bulldozer 1 with the two laser beam sensors $41_B$ disposed on the right hand and the left hand is that the relative angle between the vertical plane C formed by a laser beam and the vehicle body 2 is detected to determine the driving direction of the bulldozer 1. Specifically, the right and left laser beam sensors $41_B$ detect the relative angle between the vertical plane C and the vehicle body 2, for example, in every cycle of the bulldozer 1 (i.e., each reciprocation), and with the angle thus detected, a reference value for the yaw rate gyro 42 is set or corrected. This reference value is used for obtaining the amount of the deviation of the bulldozer 1 from a target driving direction.

Figure 7:
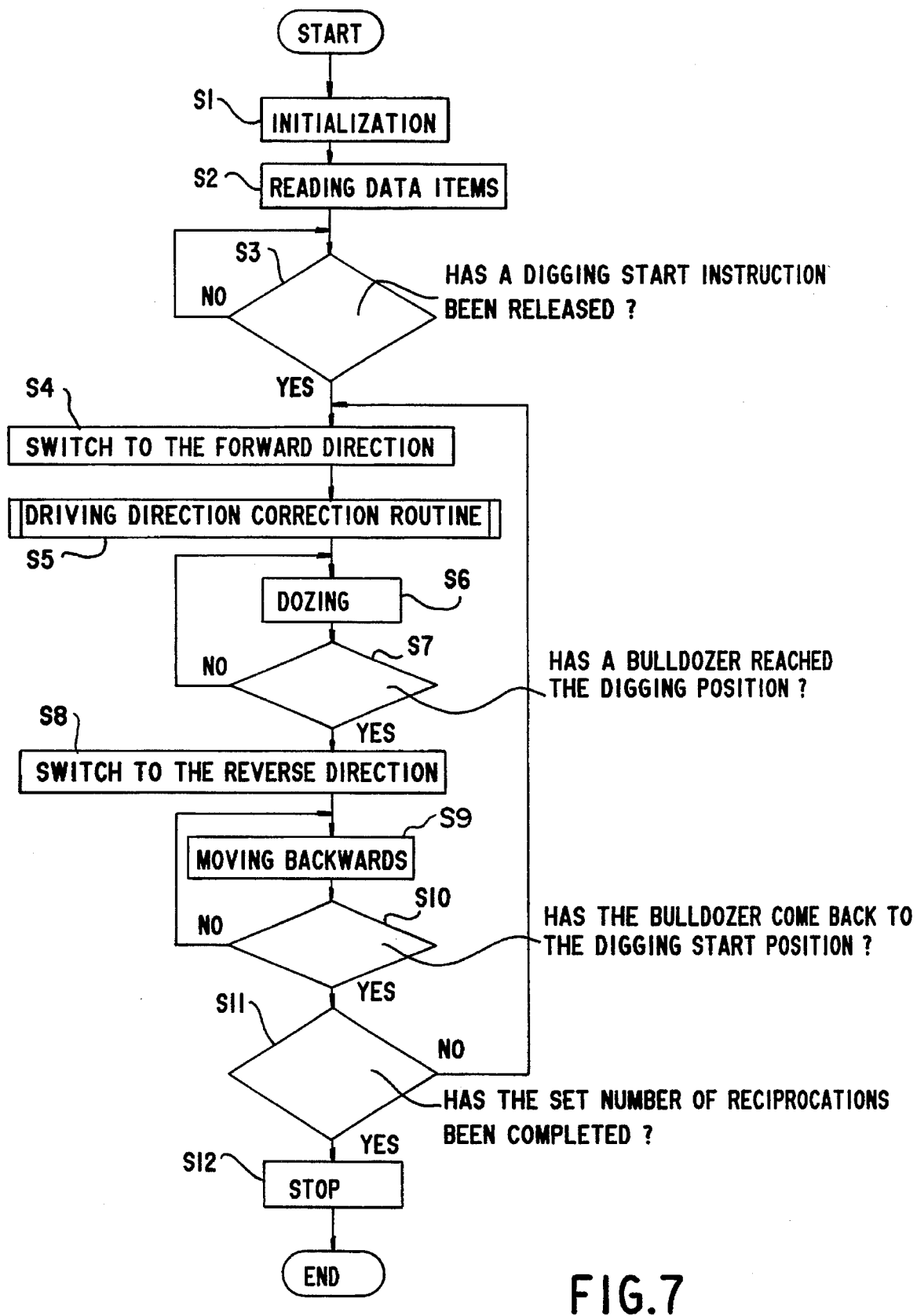

With reference to the flow chart of FIG. 7 showing a basic program for the automatic drive control system, the operation of the above described automatic drive control system for a bulldozer will be described.

Step 1: Power is loaded to start execution of the specified program and to execute initialization such as clearing of all the data of the registers in the RAM 35C. Note that the bulldozer 1 has been manually guided by the operator to the digging start position S so that it faces in a moving direction for digging. At the digging start position S, the operator manually sets a dial value corresponding to the amount of load to be imposed on the blade 7, a speed range for the transmission 25, and a dial value corresponding to the number of reciprocating movements (the number of digging cycles) in one lane. Then, the operator releases an instruction for starting digging.

Step 2: The following data items are read: (i) dial value data from the first dial switch 19A, regarding a set amount of load to be imposed on the blade 7; (ii) dial value data from the second dial switch 19B, regarding a correction value for the set amount of load; (iii) button pressing state data from the operation mode selector button 22, (iv) revolution speed data from the engine revolution sensor 32, regarding the revolution speed of the engine 23; (v) revolution speed data from the torque convertor output shaft revolution sensor 33, regarding the revolution speed of the output shaft of the torque convertor unit 24; (vi) stroke positional data from the blade lift cylinder stroke sensors 36, regarding the strokes of the pair of right and left blade lift cylinders 11; (vii) pitch angle data from the pitch angle sensor 37, regarding the pitch angle of the vehicle body 2; (viii) speed range state data from the transmission speed range sensor 38; (ix) manual operation state data of the blade 7 from the blade operation sensor 39; (x) LU/TC state data from the torque convertor LU/TC sensor 40; (xi) bulldozer positional data from the laser beam sensors 41 ($41_S$, $41_E$), regarding the present position of the bulldozer 1; (xii) yaw angle data from the yaw rate gyro 42, regarding the yaw angle of the vehicle body 2 relative to a target driving direction; (xiii) rolling angle data from the rolling angle sensor 43, regarding the rolling angle of the vehicle body 2; and (xiv) dial value data from the reciprocation frequency setting switch 44, regarding the number of reciprocating movements to be carried out by the bulldozer 1, when the bulldozer 1 is in automatic operation.

Step 3 to Step 5: The CPU waits until a digging start instruction has been released and upon release of the instruction, the forward clutch 25a of the transmission 25 is engaged. After the engagement, the bulldozer 1 starts forward movement towards the digging end position E. During the forward movement of the bulldozer 1 (more precisely, prior to dozing operation), the driving direction of the bulldozer 1 is corrected according to a driving direction correction routine to be described later (see FIG. 8), so that the bulldozer 1 is controlled to move in a straight direction.

Step 6 to Step 7: The bulldozer 1 carries out dozing until the laser beam sensors $41_B$ receive a laser beam from the laser projector $57_E$, in other words, until the bulldozer 1 has reached the digging end position (on the edge of a cliff) E. During the dozing operation, the blade lift cylinders 11 are actuated by the blade lift cylinder controller 45 such that the actual tractive force exerted on the blade 7 is coincident with a target tractive force. If the yaw rate gyro 42 detects that the bulldozer 1 deviates from the target driving direction, a necessary blade tilt amount is obtained from a characteristic map (not shown) in which blade tilt amounts are plotted against yaw angles, and according to the blade tilt amount obtained, the blade tilt cylinder 13 is actuated by the blade tilt cylinder controller 47 to correct the driving direction.

Step 8: After the laser beam sensors $41_B$ have detected that the bulldozer 1 reached the digging end position (on the edge of a cliff) E, the forward clutch 25a of the transmission 25 is disengaged and the reverse clutch 25b is engaged.

Step 9 to Step 10: The bulldozer 1 moves backwards along the specified digging lane, with the blade 7 being lifted at a specified level from the ground, until the laser beam sensors $41_B$ receive a laser beam from the laser projector $57_S$, in other words, until the bulldozer I comes back to the digging start position S.

Step 11 to Step 12: If the bulldozer 1 has not reciprocated the set number of times, the forward and backward movement of the bulldozer 1 in the same lane is repeated until the set number of reciprocations is reached. If the bulldozer 1 has reciprocated the set number of times, the dozing operation in the lane is completed and the bulldozer 1 is automatically stopped. When dozing operation in one lane (first lane) has been completed, the bulldozer 1 is manually guided by the operator to another lane (second lane) which is, for example, adjacent to the first lane, and dozing operation is carried out in the second lane in the same manner as described earlier.

Figure 8:
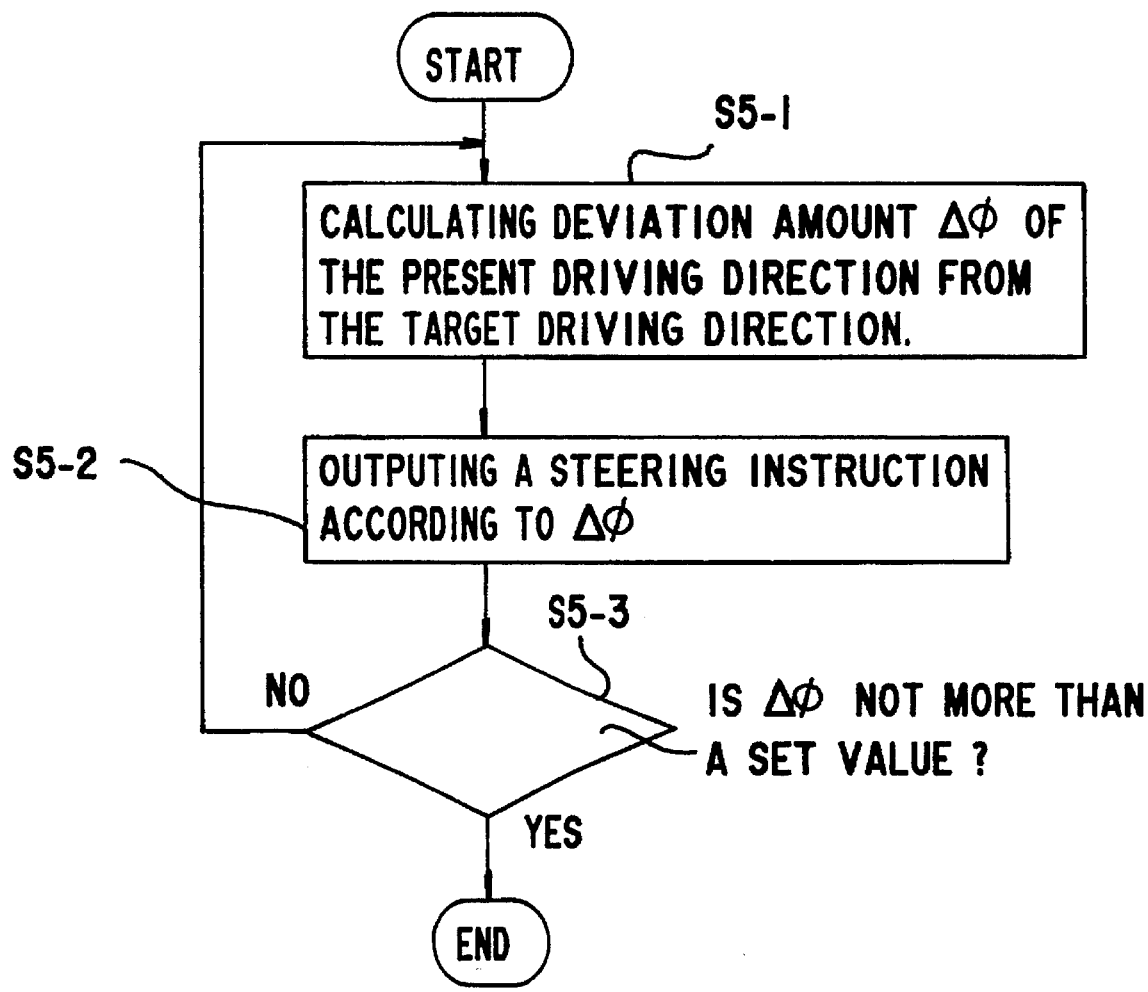

Reference is now made to the flow chart of FIG. 8 for describing the driving direction correction routine (Step 5) which is performed prior to the start of the above-described dozing operation.

Step 5-1: The deviation amount $\Delta\phi$ of the present driving direction from the target driving direction for the bulldozer 1 is obtained by integrating data from the yaw rate gyro 42.

Figure 9:
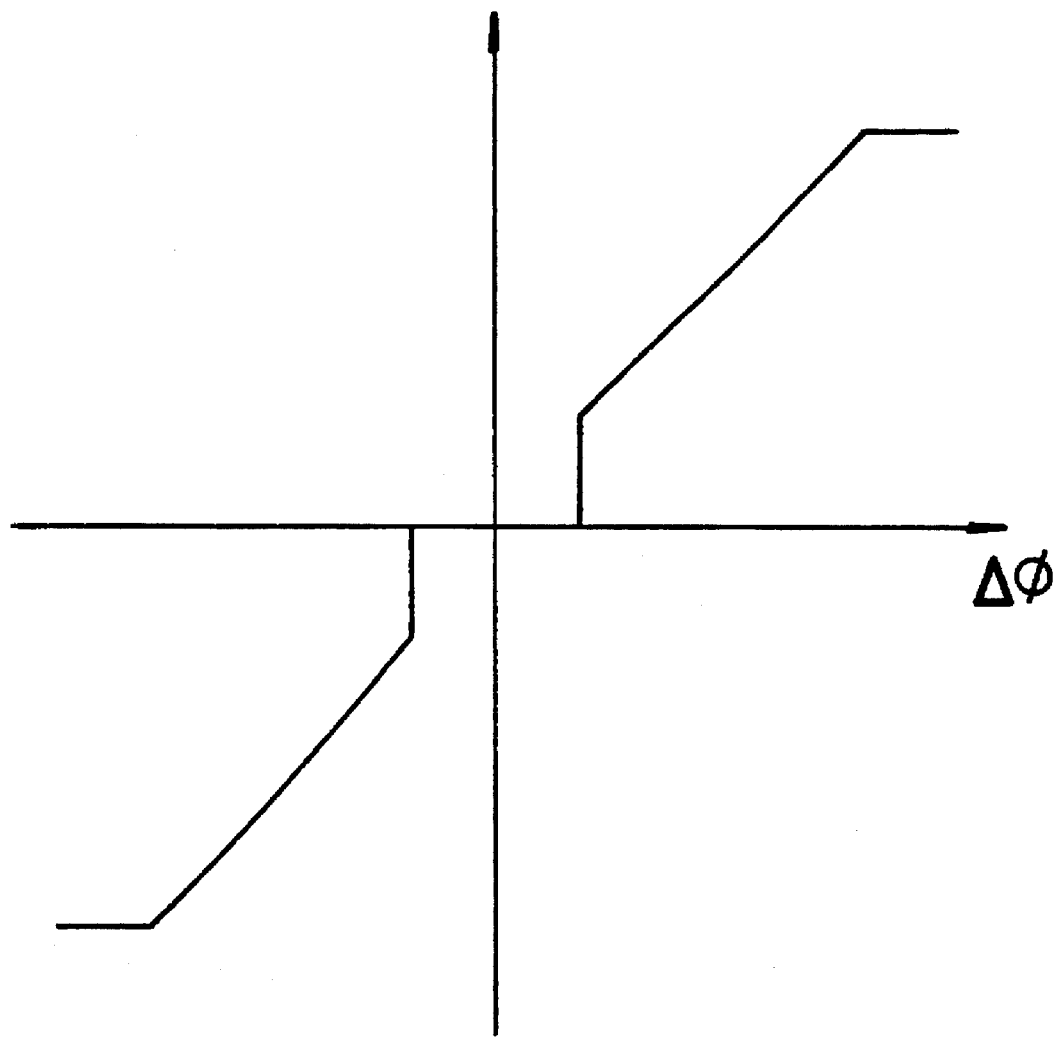

Step 5-2: Based on the deviation amount $\Delta\phi$ thus obtained, a steering instruction is obtained from the steering instruction characteristic curve map of FIG. 9. The steering instruction obtained is sent to the steering controller 30, which controls the steering actuator 50 according to the steering instruction to actuate the steering clutches 26c and the steering brakes 26d, so that the driving direction of the bulldozer 1 is corrected.

Step 5-3: If the deviation amount $\Delta\phi$ is not more than a set value, the flow is terminated. On the other hand, if the deviation amount $\Delta\phi$ is more than the set value, each step described earlier is repeated.

In the foregoing embodiment, the bulldozer 1 is automatically driven in a preset speed range selected from first to third speeds, but the bulldozer 1 is not necessarily driven in a preset speed range. For example, the following way may be taken. A maximum speed range is manually set by the operator. During automatic dozing operation, the speed of the bulldozer 1 may be automatically changed up to the set maximum speed range, according to the detected actual tractive force. During automatic backward movement, the speed is automatically changed up to the set maximum speed range, according to the inclination angle of the ground.

In the foregoing embodiment, the bulldozer 1 is guided to a specified lane by the manual operation of the operator. However, the operator may use a radio controller (remote controller by radio waves) at a point remote from the bulldozer 1, for guiding the bulldozer 1 to a specified lane; for determining the digging start position and the digging end position; for setting a target tractive force, a maximum speed range anti the number of digging cycles; for changing lanes; and for performing ripper control. The use of a radio controller reduces the time required for operating one bulldozer, so that one operator can supervise a plurality of bulldozers 1. This increases the efficiency of the dozing operation. In this case, it is preferable that the radio controller is equipped with an emergency stop button so that the bulldozer 1 can be stopped in case of emergency by depressing this emergency stop button by the operator. Further, it is preferable to incorporate a system for dealing with abnormal situations. In the event that an abnormal situation arises in the bulldozer 1, for example, when abnormal water temperature or abnormal oil temperature is detected by a vehicle monitor, the system stops the bulldozer 1 after backwardly moving it to the digging start position and lights a lamp for indicating the occurrence of an abnormality.

Although two laser beam sensors $41_B$ arc disposed on the right and left side of the bonnet 3 in the foregoing embodiment, it is readily apparent that another laser beam sensor $41_B$ may be provided on the cabin (not shown in FIG. 1). The first and second laser beam sensors $41_B$ on the bonnet 3 may be used for detecting a dropping position from which soil will be dropped to start controlling the dropping work of the bulldozer 1, while the third laser beam sensor $41_B$ on the cabin may be used for determining a position from which backward movement starts.

In order to make the detection of the dropping position (the edge of a cliff) more reliable and to securely prevent the bulldozer 1 from falling off the edge of a cliff, a required number of ultrasonic sonars may be provided at specified positions of the vehicle body 2. These sonars detect the distance to the ground which serves as a reflector, and it can be judged that a place where any of the sonars does not react is the dropping position. In a preferred embodiment, each side of the vehicle body 2 is provided with an ultrasonic sonar such that the sonars project ultrasonic waves diagonally ahead of the vehicle body 2. When either of the ultrasonic sonars does not react, it is judged that the bulldozer 1 is on the edge of a cliff. In this case, the mounting angle (i.e., projecting angle) of each ultrasonic sonar may be adjustable in accordance with how soil is dropped from the cliff. This ultrasonic sonar may be designed to release an emergency stop instruction when the bulldozer abnormally comes near to another bulldozer. In this way, the ultrasonic sonar can be utilized for preventing a bulldozer crush.

Figure 10A:
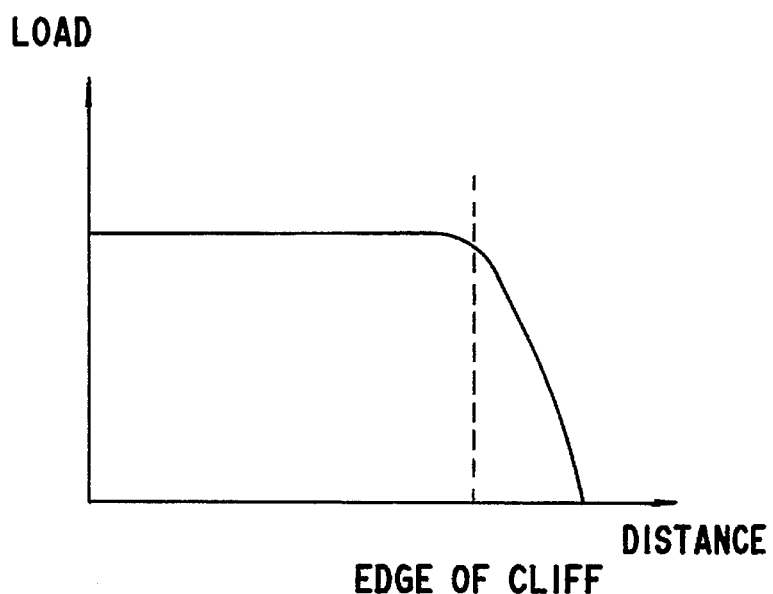
Figure 10B:
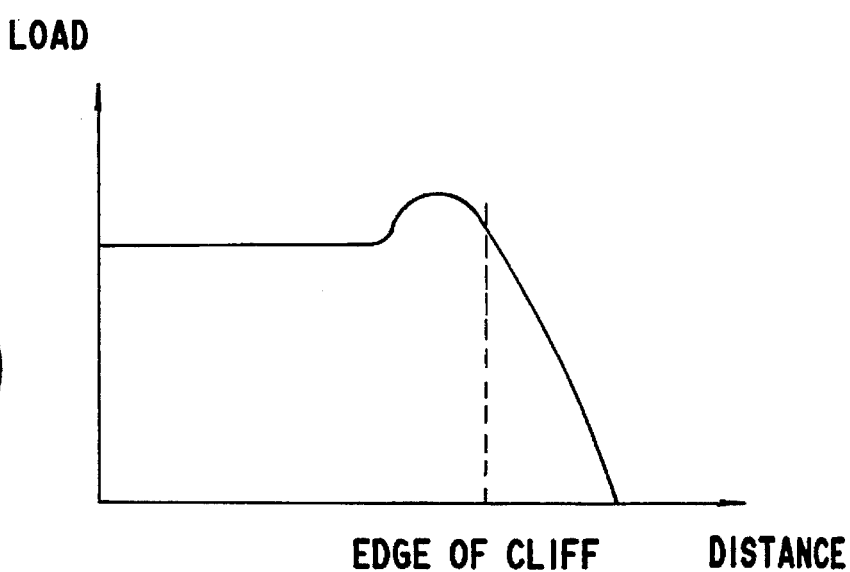

The dropping position can be detected by other means than ultrasonic sonars. For example, it may be detected from a change pattern of an actual tractive force exerted on the blade 7. Specifically, this detection method is based on the fact that after soil has been dropped from a cliff, the load imposed on the blade 7 decreases sharply as shown in FIG. 10. Therefore, it can be judged from such a change in the load that the bulldozer 1 is on the edge of a cliff. FIG. 10(a) shows a load pattern in cases where soil is dropped at one time (one-time dropping). FIG. 10(b) shows a load pattern in cases where some of soil is dropped upon completion of a first forward movement, and then the bulldozer 1 moves back once to start a second forward movement and the rest of soil is dropped upon completion of the second forward movement (two-time dropping).

These dropping position detecting means (i.e., ultrasonic sonars and a detector for detecting a load change) are preferably employed as auxiliary means for the detecting means comprised of the laser projectors and laser beam sensors. The use of a plurality of detectors ensures more reliable detection of the edge of a cliff.

Figure 11:
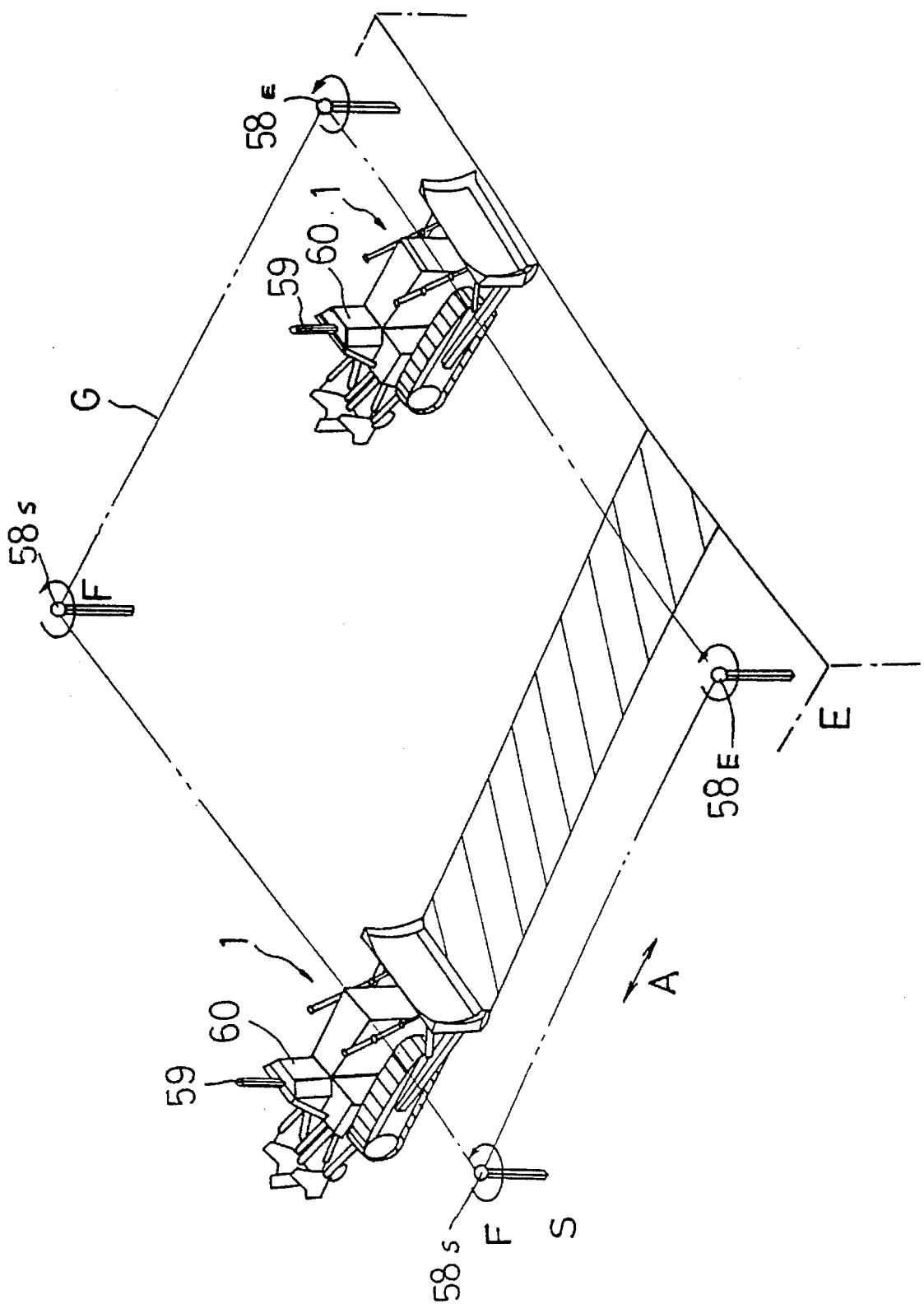

Reference is made to FIG. 11 for describing another embodiment of the position and direction measuring system for the bulldozer 1.

Figure 12:
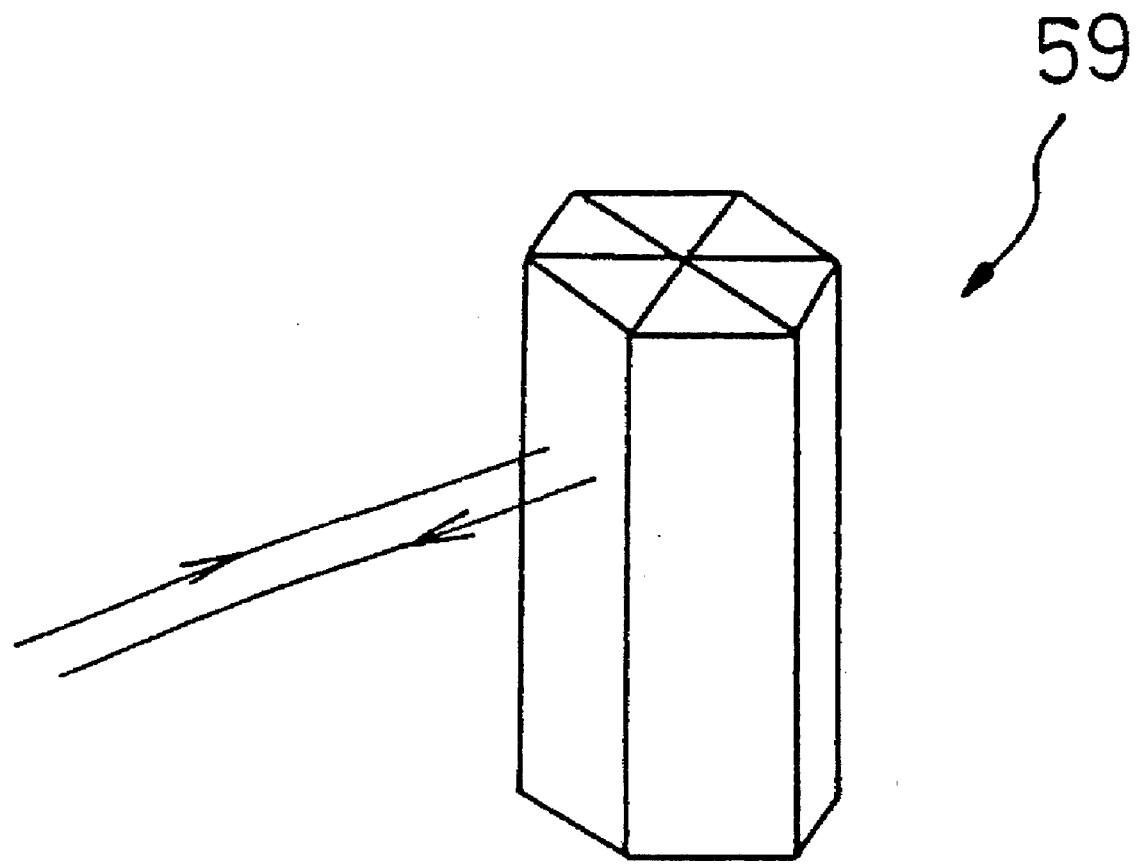

In this embodiment, the corners of the dozing area of the bulldozer 1 are provided with four laser beam projecting/receiving devices $58_S$, $58_E$, respectively. Disposed on a cabin 60 of the bulldozer 1 is a reflector (corner cube linear array) 59 for reflecting laser beams directed from the laser beam projecting/receiving devices $58_S$, $58_E$ in the same direction. The laser projecting part of each of the laser beam projecting/receiving devices $58_S$, $58_E$ is rotatable around a vertical axis in the direction of arrow F, so that a horizontal plane G is formed in the dozing area of the bulldozer 1 by laser beams projected from the laser beam projecting/receiving devices $58_S$, $58_E$. The reflector 59 is hexagonal prismatic as shown in FIG. 12 and disposed with its longitudinal axis being vertically oriented such that the reflector 59 intersects the horizontal plane G. The arrows in FIG. 12 represent an incident laser beam and a reflected laser beam, respectively. The long shape of the reflector 59 allows the reflector 59 to perform reliable positional detection even if the vehicle body 2 of the bulldozer 1 rocks laterally during driving. In this embodiment, data from the laser beam projecting/receiving devices $58_S$, $58_E$ is input to a computer (not shown) installed on the ground.

According to this embodiment, all the laser beam projecting/receiving devices $58_S$, $58_E$ are rotated synchronously so that the present position of the bulldozer 1 can be obtained from the principle of "trigonometrical survey" by the use of the laser beam projecting/receiving devices $58_S$, $58_E$ located at the two positions (i.e., the digging start position and the digging end position). By continuously tracking the position of the bulldozer 1 with the laser beam projecting/receiving devices $58_S$, $58_E$, the driving direction and actual vehicle speed of the bulldozer 1 can be obtained through arithmetic operation. Data obtained from the arithmetic operation is sent from the computer on the ground to the bulldozer 1 by radio transmission, and based on the data, the operation of the bulldozer 1 is controlled.

The use of the position and direction measuring system of the second embodiment makes it possible to correct the driving direction without the yaw rate gyro 42 which is used in the first embodiment. It is also possible to correct the reference value for the yaw rate gyro 42, according to a driving direction calculated from data sent from the laser beam projecting/receiving devices $58_S$, $58_E$. Like the first embodiment, dropping position detecting means may be used together with the system of the second embodiment. There are advantages in using the dropping position detecting means together with the system of the second embodiment; for example, the danger of falling off a cliff can be notified to the operator even when manual operation is carried out. Therefore, the system can exert its full efficiencies.

It is to be understood that although four laser beam projecting/receiving devices $58_S$, $58_E$ are employed in the second embodiment for fear that other bulldozers might intercept laser beams when a plurality of bulldozers are operated, two laser beam projecting/receiving devices are enough to carry out the measurement of the position and driving direction of the bulldozer 1.

In addition to the yaw rate gyro 42 and the two laser beam projecting/receiving devices $58_S$, $58_E$, an azimuth sensor, which detects the azimuth of the bulldozer 1 by utilizing earth magnetism, may be used as the means for detecting the driving direction of the bulldozer 1. However, it should be noted that in the case of utilizing the azimuth sensor, the bulldozer 1 has to be stopped for a specified time when the driving direction of the bulldozer 1 is sensed by the sensor.

Although a laser beam is used in the foregoing embodiments for detecting that the bulldozer 1 has returned to the digging start position S, the return of the bulldozer 1 may be determined in the following way. When the bulldozer 1 moves backwards, the number of revolutions of the sprockets 6 for actuating the crawler belts is counted immediately after it has left the digging end position E. From the number of revolutions counted, the backward moving distance of the bulldozer 1 could be obtained.

In the foregoing embodiment, the bulldozer 1 is automatically driven in a specified lane while changing of lanes is carried out by manual operation (including radio control). However, changing lanes could be carried out automatically with a digging program for a preset working area, the program being preliminarily input in a computer. In this case, unmanned dozing operation can be carried out for a limited length of time (e.g., during nighttime).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic drive control system for a bulldozer which is capable of automatically driving a bulldozer such that the bulldozer moves back and forth predetermined times between a digging start position and a digging end position, the automatic drive control system comprising:

(a) digging start detecting means for detecting that the bulldozer is in the digging start position;

(b) digging end detecting means for detecting that the bulldozer is in the digging end position;

(c) driving direction detecting means for detecting the momentarily varying driving direction of the bulldozer; and (d) drive controlling means for shifting a transmission into a forward gear when the digging start detecting means detects that the bulldozer is presently in the digging start position; shifting the transmission into a reverse gear when the digging end detecting means detects that the bulldozer is presently in the digging end position; and controlling the bulldozer such that the driving direction detected by the driving direction detecting means is made coincident with a target driving direction when the bulldozer is moving from the digging start position towards the digging end position.

2. The automatic drive control system for a bulldozer as claimed in claim 1, further comprising driving direction changing means for changing the driving direction of the bulldozer.

3. The automatic drive control system for a bulldozer as claimed in claim 1, further comprising blade controlling means for controlling lifting and lowering of the blade such that an actual tractive force exerted on the vehicle body is made coincident with a set target tractive force while the bulldozer is moving from the digging start position towards the digging end position.

4. The automatic drive control system for a bulldozer as claimed in claim 1, wherein the digging start detecting means comprises at least one laser projector installed on the ground and a laser beam sensor provided in the bulldozer for receiving a laser beam from the laser projector.

5. The automatic drive control system for a bulldozer as claimed in claim 1, wherein the digging start detecting means comprises at least one laser beam projecting/receiving device installed on the ground and a reflector provided in the bulldozer for reflecting a laser beam directed from the laser beam projecting/receiving device in the same direction.

6. The automatic drive control system for a bulldozer as claimed in claim 1, wherein the digging start detecting means is a detector which detects that the bulldozer has returned to the digging start position, by counting the number of revolutions of sprockets for actuating crawler belts, the count being started immediately after the bulldozer has left the digging end position, when the bulldozer moves backwards.

7. The automatic drive control system for a bulldozer as claimed in claim 1, wherein the digging end position is an edge of a cliff from which removed soil are to be dropped and the digging end detecting means is for detecting that the forward end of the bulldozer is on the edge of a cliff.

8. The automatic drive control system for a bulldozer as claimed in claim 7, wherein the digging end detecting means comprises at least one laser projector installed on the ground and a laser beam sensor provided in the bulldozer for receiving a laser beam directed from the laser projector.

9. The automatic drive control system for a bulldozer as claimed in claim 7, wherein the digging end detecting means comprises at least one laser beam projecting/receiving device installed on the ground and a reflector provided in the bulldozer for reflecting a laser beam directed from the laser beam projecting/receiving device in the same direction.

10. The automatic drive control system for a bulldozer as claimed in claim 7, wherein the digging end detecting means comprises an ultrasonic sonar provided in the bulldozer for projecting ultrasonic waves ahead of the vehicle body to detect the presence or absence of the ground.

11. The automatic drive control system for a bulldozer as claimed in claim 10, wherein the projecting angle of the ultrasonic sonar is adjustable.

12. The automatic drive control system for a bulldozer as claimed in claim 7, wherein the digging end detecting means comprises a load detector for detecting a change in load imposed on a blade to estimate the amount of soil present in front of the blade.

13. The automatic drive control system for a bulldozer as claimed in claim 4 or 8, wherein the laser projector is rotatable within a vertical plane and the laser beam sensor is disposed such that its longitudinal axis is horizontally oriented.

14. The automatic drive control system for a bulldozer as claimed in claim 5 or 9, wherein the laser beam projecting/receiving device is rotatable within a horizontal plane and the reflector is disposed such that its longitudinal axis is vertically oriented.

15. The automatic drive control system for a bulldozer as claimed in claim 1 or 2, wherein the driving direction detecting means comprises an azimuth sensor for detecting a direction, utilizing earth magnetism.

16. The automatic drive control system for a bulldozer as claimed in claim 1 or 2, wherein the driving direction detecting means comprises at least two laser beam projecting/receiving devices installed on the ground which are rotatable within a horizontal plane to project laser beams synchronously and a reflector which reflects laser beams directed from the laser beam projecting/receiving devices in the same direction and which is provided in the bulldozer such that its longitudinal axis is vertically oriented.

17. The automatic drive control system for a bulldozer as claimed in claim 1 or 2, wherein the driving direction detecting means comprises (i) at least one laser projector installed on the ground and rotatable within a vertical plane, and (ii) at least two laser beam sensors which are provided in the bulldozer such that their longitudinal axes are horizontally oriented and which receive laser beams directed from the laser projector, and wherein the laser beam sensors detect the relative angle between the plane of a laser beam directed from the laser projector and the vehicle body, thereby detecting the driving direction of the bulldozer.

18. The automatic drive control system for a bulldozer as claimed in claim 1 or 2, wherein the driving direction detecting means detects the driving direction of the bulldozer by integrating data from a yaw rate gyro provided in the bulldozer.

19. The automatic drive control system for a bulldozer as claimed in claim 2, wherein the driving direction changing means is a steering system which transmits the power of an engine to fight and left sprockets for actuating crawler belts by means of clutches and brakes, and the clutches and brakes are independently engaged or disengaged prior to a start of dozing operation to change the driving direction of the bulldozer.

20. The automatic drive control system for a bulldozer as claimed in claim 2, wherein the driving direction changing means tilts the blade laterally during dozing operation to change the driving direction of the bulldozer.

21. The automatic drive control system for a bulldozer as claimed in claim 1, further comprising remote control means for guiding the bulldozer to a desired digging lane.

* * * * *